United States Patent
Tyma

(10) Patent No.: US 10,310,210 B2
(45) Date of Patent: Jun. 4, 2019

(54) FIBER OPTIC CABLE WITH ATTACHMENT SECTION AND METHODS OF INSTALLATION THEREOF

(71) Applicant: Corning Optical Communications LLC, Hickory, NC (US)

(72) Inventor: Paul Martin Tyma, Morgan Hill, CA (US)

(73) Assignee: Corning Optical Communications LLC, Hickory, NC (US)

( * ) Notice: Subject to any disclaimer, the term of this patent is extended or adjusted under 35 U.S.C. 154(b) by 678 days.

(21) Appl. No.: 14/947,470

(22) Filed: Nov. 20, 2015

(65) Prior Publication Data

US 2016/0147031 A1   May 26, 2016

Related U.S. Application Data

(60) Provisional application No. 62/084,211, filed on Nov. 25, 2014.

(51) Int. Cl.
  *G02B 6/46* (2006.01)
  *G02B 6/44* (2006.01)
  *H01B 7/40* (2006.01)

(52) U.S. Cl.
  CPC .............. *G02B 6/46* (2013.01); *G02B 6/443* (2013.01); *G02B 6/4466* (2013.01); *G02B 6/4471* (2013.01); *H01B 7/40* (2013.01)

(58) Field of Classification Search
  None
  See application file for complete search history.

(56) References Cited

U.S. PATENT DOCUMENTS

| | | | | |
|---|---|---|---|---|
| 1,798,035 A | * | 3/1931 | Schemmel | H01B 7/40 174/117 F |
| 4,504,112 A | * | 3/1985 | Gould | G02B 6/4436 219/121.63 |
| 4,933,513 A | * | 6/1990 | Lee | H01B 7/0823 174/115 |
| 4,952,020 A | * | 8/1990 | Huber | G02B 6/4403 174/117 R |

(Continued)

FOREIGN PATENT DOCUMENTS

| | | |
|---|---|---|
| CN | 103915148 A | 7/2014 |
| DE | 2524939 A1 * | 12/1976 |
| JP | 2004-354786 A * | 12/2004 |

OTHER PUBLICATIONS

Corning Evolant Solutions, EVO-787-EN, MDU Engineering and Design Guide, Clear Curve and Traditional Deployment Solutions, Copyright 2010 Corning Cable Systems, 57 pages.

*Primary Examiner* — Michael Stahl
(74) *Attorney, Agent, or Firm* — C. Keith Montgomery

(57) ABSTRACT

A fiber optical cable has a communication section and an attachment section. The attachment section is meant to be installed below the communication section, so that when the cable is mounted to a surface, the communication section drops vertically with respect to the attachment section, thereby obscuring part of the attachment section from view. The attachment section may also be moved manually over the attachment section so as to overlap the attachment section. Ties or other means may be used to retain the communication section in the overlapped position.

24 Claims, 3 Drawing Sheets

(56) References Cited

U.S. PATENT DOCUMENTS

| | | | | |
|---|---|---|---|---|
| 5,267,069 A | * | 11/1993 | Griffin | H04L 29/06 |
| | | | | 370/522 |
| 7,397,993 B1 | | 7/2008 | Nave et al. | |
| 8,290,320 B2 | | 10/2012 | Kachmar | |
| 2001/0015282 A1 | * | 8/2001 | Scantlebury | H01B 7/40 |
| | | | | 174/117 F |
| 2008/0240660 A1 | * | 10/2008 | Nave | G02B 6/443 |
| | | | | 385/103 |
| 2008/0289852 A1 | * | 11/2008 | Lind | H01B 7/40 |
| | | | | 174/117 F |
| 2012/0281958 A1 | * | 11/2012 | Petersen | G02B 6/4471 |
| | | | | 385/135 |

* cited by examiner

FIBER OPTIC CABLE WITH ATTACHMENT SECTION AND METHODS OF INSTALLATION THEREOF

PRIORITY APPLICATION

This application claims the benefit of priority under 35 U.S.C. § 119 of U.S. Provisional Application No. 62/084,211, filed on Nov. 25, 2014, the content of which is relied upon and incorporated herein by reference in its entirety.

BACKGROUND

Multi-Dwelling Unit (MDU) cable installations utilize drop (or "home-run") cables that extend to tenant living units. Conventional surface or "facade" installations involve attaching the cable directly to a wall using fasteners such as cable clips, clamps, and cable ties. This is problematic for several reasons: 1) it is time-consuming and tedious to evenly space and then install the fasteners, 2) a variety of fasteners must be kept in inventory to match building aesthetics, and 3) the installed fastener are unsightly and draw attention to the cable installations. Cables may also be stapled directly to a mounting surface, but this can result in puncture of the communication section of the cable, but the staples remain visible to building occupants, and works well on a limited number of surfaces, such as wood.

SUMMARY

According to one embodiment, a method of installing a fiber optic cable on a surface comprises providing a cable comprising a communication section and an attachment section connected to the communication section, the communication section having at least one optical fiber, placing the cable adjacent the surface, securing the attachment section to the surface with at least one attachment member, and moving the communication section with respect to the attachment section so that the communication section at least partially overlaps a facing surface of the attachment section.

According to another embodiment, a fiber optic cable comprises communication section having at least one optical fiber, and an attachment section connected to the communication section. The communication section may be configured to rotate with respect to the attachment section so that the communication section at least partially overlaps a facing surface of the attachment section. The communication section and the attachment section may comprise a common, unitary extrudate polymeric material, and the web may have a thickness that is less than 25% of a major dimension of the communication section.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
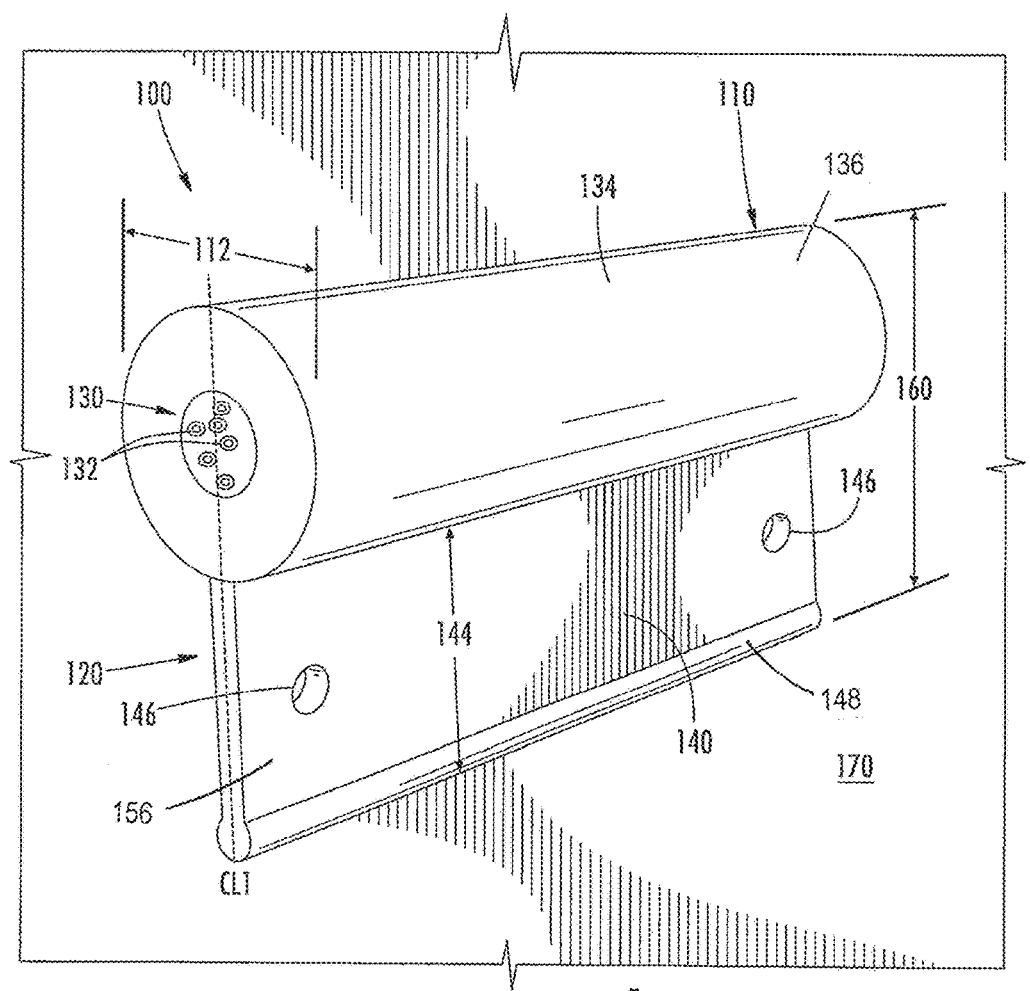
FIG. 1 is perspective view of a section of a fiber optic cable according to a first embodiment.

FIG. 1 is a perspective view of a section of a fiber optic cable 100 according to a first embodiment, prior to installation on a surface 170. The cable 100 comprises a communication section 110 having a major dimension 112. In FIG. 1, the major dimension 112 is illustrated as a width, or more specifically in FIG. 1, as a diameter of the communication section 110. The communication section 110 is connected to an attachment section 120 that serves to install the cable 100 to the surface 170. The cable 100 is suitable for use as, for example, a drop cable in a fiber optic deployment in an MDU, and in other environments.

The communication section 110 has a core 130 that accommodates one or more optical fibers 132. The core 130 could alternatively or in addition include electrically conductive components, such as copper conductors (not illustrated). The attachment section 120 is integrally attached to the communication section 110, and the two sections can comprise, for example, a unitary extrudate 134 formed by the same extrusion process (e.g., through coextrusion), from, for example, a common polymeric material. The portion of the communication section 110 surrounding the fibers 132 can be generally referred to as the jacket 136 of the cable. According to one embodiment, the attachment section 120 can be extruded from a different material than that of the jacket 136, such as a polymer having different material properties than those of the communication section that can be secured to the material forming the jacket 136 through a coextrusion process or by other means.

The exemplary communication section 110 can have a generally tubular shape in which the core 130 is formed along the centerline of the tube formed by the jacket 136. The optical fibers 132 extend along the length of the cable 100. The core 130 may accommodate additional components, such as strength members, water blocking components, electrical conductors, and other components (not illustrated). The exemplary communication section 110 is described by way of example as having a 'diameter', although it is understood that even cables sold as 'round' or 'circular' may deviate form a perfect circular section, particularly after installation. Other cable cross-sections, such as oblong, or other tubular forms may also be used in the communication section 110.

The exemplary attachment section 120 may have a flat, plate-like web 140 with opposed, generally flat sides. The web 140 may have a thickness that is less than, for example, 25% of the major dimension 112, and a length 144 that is at least 50% of the major dimension 112. According to another embodiment, the web 140 has a thickness that is less than 15% of the major dimension 112, and a length 144 that is at least 75% of the major dimension 112.

The web 140 can include one or more apertures 146 to facilitate attachment of the cable 100 to a surface. The apertures 146 can be configured to receive, for example, nails, screws, and tacks, or they may be spaced at regular intervals on the cable 100 to receive the points of a staple of a predetermined size. The web 140 can be relatively uniform in thickness, although a bead 148 can extend along the distal edge of the attachment section 120 to prevent tears in the web 140. Although the cable 100 is illustrated as symmetric about CL1, the cable may be tailored to provide desired to provide specific installation and aesthetic properties. For example, one side of the web 140, which is intended to abut the surface 170 during installation, can be generally flat so that it conforms to the surface 170. The outwardly-facing surface 156 can have aesthetic features, such as patterning, designed to emulate the visual appearance of the surface 170 so as to reduce the visual impact of the cable installation. The apertures can also be configured so that they do not extend wholly through the web, and can instead be indentations or recesses that aid in the placement of attachment members during installation.

Prior to installation, the cable 100 has a height 160, extending from one end of the communication section 110 to a distal end of the attachment section 120. The height 160 is measured from an end of the attachment section 120 to a distal end of the communication section 110.

Figure 2:
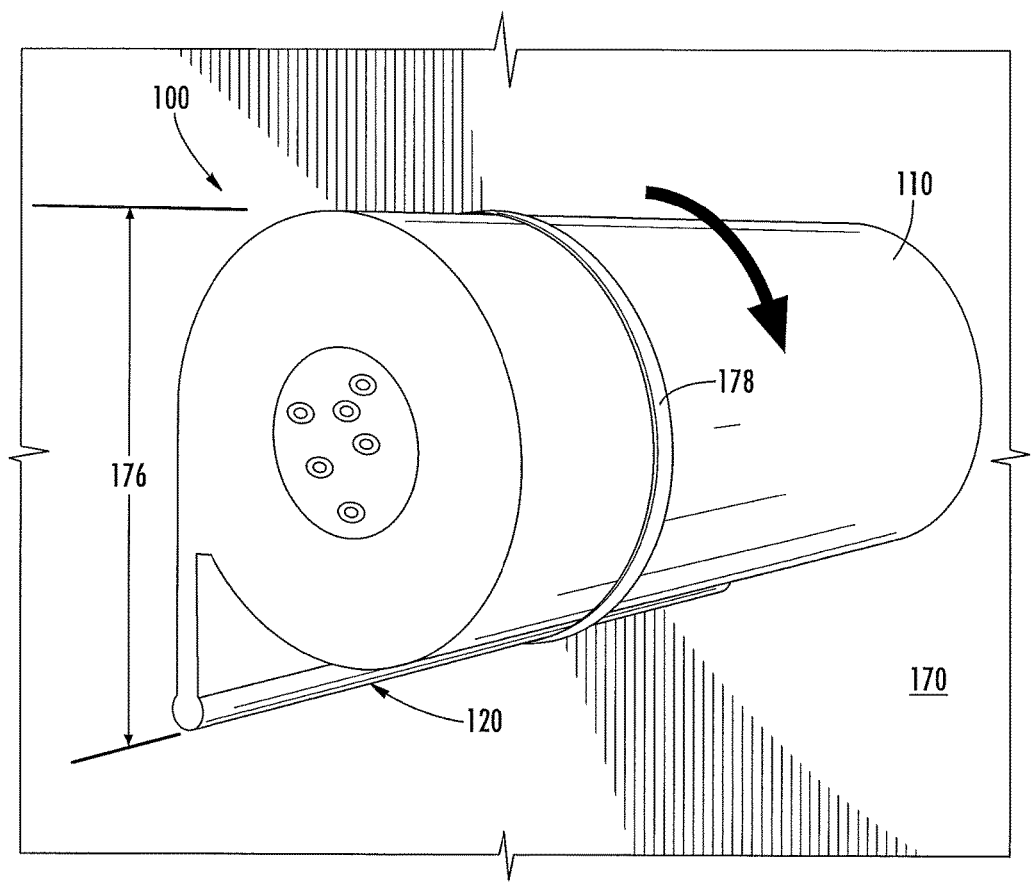
FIG. 2 illustrates the cable of FIG. 1 after installation on a surface.

FIG. 2 illustrates the cable 100 installed on a surface 170. The surface 170 may be, for example, a vertical or horizontal surface of a building, such as wood, drywall and other surfaces. In the illustrated embodiment, the surface 170 is a vertical building surface. To install the cable 100 on the surface 170, the cable 100 is placed adjacent the surface 170. Attachment members, such as nails, tacks, or staples (not shown), are then forced through the apertures 146 into the surface 170. Alternatively, the attachment members can be hammered or pressed etc. directly through the web 140 without using apertures or recesses.

After securing the attachment section 120 to the surface, the communication section 110 can then be manually rotated or rolled over the web 140, as indicated by the arrow in FIG. 2 to a 'closed', or installed position. In this position, the communication section 110 at least partially overlaps and obscures a facing surface of the attachment section 120. One or more conventional ties 178 or other means can be used to secure the cable 100 in the installed position.

The attachment section 120 may also include a flexible strength member (not shown), such as an elongate rod extending the cable length, that allows an externally extruded feature to clip into the strength member after installation of the cable to the mounting surface. This solution obviates the need for cable ties to secure the cable in its installed position.

The cross section of the cable 100, and the extrudate material 134 can be selected to allow for the communication section 110 to rotate under the influence of gravity upon attachment to the surface 170. The communication section 110 in this embodiment would be placed vertically above the attachment section 120 during installation. This solution also obviates the need for cable ties to secure the cable in its installed position.

According to one aspect, rotation of the communication section 110 reduces the overall footprint of the cable 100 without removing any cable material. The height of the cable, for example, changes from the height 160 shown in FIG. 1, to the height 176 shown in FIG. 2. The installed height 176 can be, for example, less than 90% of the original height 160. According to another embodiment, the installed height 176 can be, for example, less than 80% of the original height 160. Rotation of the communication section 110 can also be configured to hide attachment members from view, as shown in FIG. 2, providing an aesthetically pleasing installed profile.

If the cable 100 is installed along a horizontal path on a vertical surface, the lowest part of the communication section 110 can be configured to be lower than the apertures 146, so that the communication section 110 wholly or partially obscures the attachment members from view. If no apertures are used, any attachment members hammered through the web 140 can be placed high enough on the web 140 so that the communication section 110 covers the members after rotation of the communication section 110.

According to another aspect, the cable 100 allows for reduced installation time on a variety of building surfaces, using a wide variety of conventional, commercially available fasteners.

Figure 3:
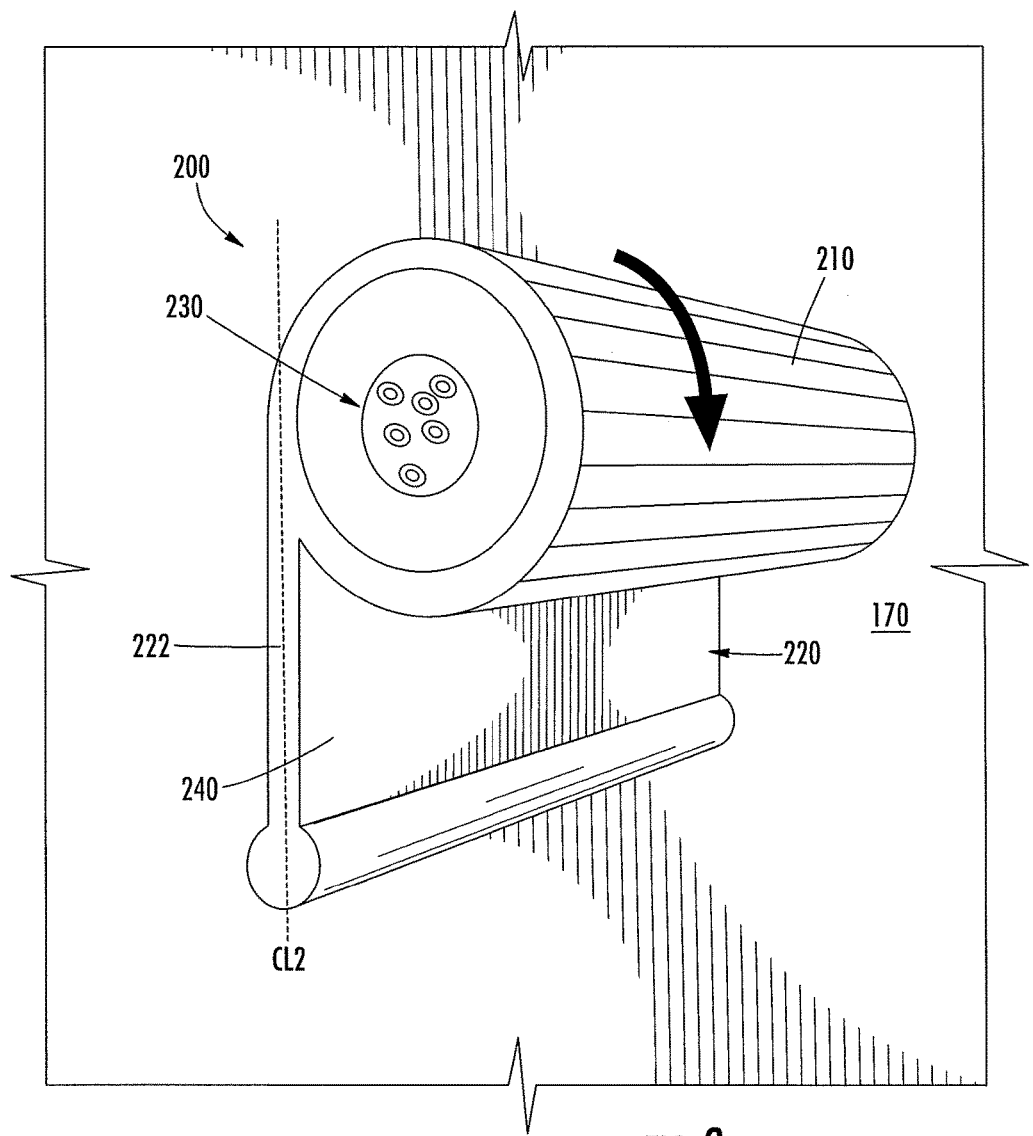
FIG. 3 is perspective view of a section of a fiber optic cable according to a second embodiment.

FIG. 3 is perspective view of a section of a fiber optic cable 200 according to a second embodiment. The cable 200 may have a communication section 210, an attachment section 220 and a core 230 that are similar in structure to those of the cable 100. However, the centerline CL2 of the attachment section 220 is offset from the centerline of the communication section 210. The attachment section 220 can have a mounting face surface 222 that is generally continuous with the exterior of one side of the communication section 210. The attachment section 220 is integrally attached to the communication section 210, and the two sections can comprise, for example, a unitary extrudate formed by the same extrusion process from a common polymeric material.

To install the cable 200 on a surface, the mounting face surface 222 is placed against a mounting surface 170, and attachment member members are either pounded through the web 240, or through apertures (not shown) in the web 240. The offset location of the attachment section 220 means that the communication section 210 can rotate more easily in the direction of the arrow with respect the attachment section 220. The cable 200 is also easier to install as the side of the cable 200 pressed against the mounting surface during installation is essentially flat. The installed height can be, for example, less than 90% of the original height. According to another embodiment, the installed height can be, for example, less than 80% of the original height. Rotation of the communication section 210 can also be configured to hide attachment members from view.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of installing a fiber optic cable on a surface, comprising:

providing a cable comprising a communication section and an attachment section connected to the communication section, the communication section having at least one optical fiber;

placing the cable adjacent the surface;

securing the attachment section to the surface with at least one attachment member;

manually pulling the communication section so that the communication section rotates with respect to the attachment section and so that the communication section at least partially overlaps a facing surface of the attachment section; and securing the cable in the installed position with at least one tie.

2. The method of claim 1, wherein the cable has an original height before installation, and an installed height after installation that is less than 90% of the original height.

3. The method of claim 1, wherein the cable has an original height before installation, and an installed height after installation that is less than 80% of the original height.

4. The method of claim 1, wherein the communication section and the attachment section comprise a common, unitary extrudate material.

5. The method of claim 4, wherein the unitary extrudate material is polymeric.

6. The method of claim 1, wherein the attachment section has a web with opposed, substantially flat sides.

7. The method of claim 6, wherein the web has a thickness that is less than 25% of a major dimension of the communication section.

8. The method of claim 7, wherein the web has a thickness that is less than 15% of a major dimension of the communication section.

9. The method of claim 7, wherein the web has a centerline that extends through a center of the communication section.

10. The method of claim 7, wherein the web has a centerline that is offset with respect to a center of the communication section.

11. The method of claim 6, wherein securing the attachment section to the surface with at least one attachment member comprises forcing a plurality of staples through the web and into the surface.

12. The method of claim 1, wherein the at least one attachment member comprises a plurality of members selected from the group consisting of: nails, screws, staples, and tacks.

13. The method of claim 1, wherein placing the cable adjacent the surface comprises orienting the cable so that the communication section is located above the attachment section.

14. The method of claim 6, wherein the web comprises a plurality of apertures, and wherein securing the attachment section to the surface comprises forcing the attachment members through the apertures.

15. A method of installing a fiber optic cable on a surface, comprising:

providing a cable comprising a communication section and an attachment section connected to the communication section, the communication section having at least one optical fiber;

placing the cable adjacent the surface;

securing the attachment section to the surface with at least one attachment member;

moving the communication section with respect to the attachment section so that the communication section at least partially overlaps a facing surface of the attachment section; and securing the cable in the installed position with at least one tie.

16. The method of claim 15, wherein moving the communication section with respect to the attachment section comprises allowing gravity to pull the communication section downward.

17. The method of claim 15, wherein the communication section rotates with respect to the attachment section as it moves with respect to the attachment section.

18. The method of claim 15, wherein the cable has an original height before installation, and an installed height after installation that is less than 90% of the original height.

19. The method of claim 15, wherein the cable has an original height before installation, and an installed height after installation that is less than 80% of the original height.

20. The method of claim 15, wherein the communication section and the attachment section comprise a common, unitary extrudate material.

21. The method of claim 20, wherein the unitary extrudate material is polymeric.

22. The method of claim 15, wherein the attachment section has a web with opposed, substantially flat sides.

23. The method of claim 22, wherein the web has a thickness that is less than 25% of a major dimension of the communication section.

24. The method of claim 15, wherein the at least one attachment member comprises a plurality of members selected from the group consisting of: nails, screws, staples, and tacks.

* * * * *